US012740558B2

(12) United States Patent
Coscia

(10) Patent No.: US 12,740,558 B2
(45) Date of Patent: Sep. 22, 2026

(54) BAG HOLDER FOR BLAST FREEZING

(71) Applicant: ENTEGRIS, INC., Billerica, MA (US)

(72) Inventor: Nicholas Coscia, Lexington, MA (US)

(73) Assignee: Entegris, Inc., Billerica, MA (US)

( * ) Notice: Subject to any disclaimer, the term of this patent is extended or adjusted under 35 U.S.C. 154(b) by 595 days.

(21) Appl. No.: 17/698,207

(22) Filed: Mar. 18, 2022

(65) Prior Publication Data

US 2022/0295784 A1 Sep. 22, 2022

Related U.S. Application Data

(60) Provisional application No. 63/163,547, filed on Mar. 19, 2021.

(51) Int. Cl.
*A01N 1/148* (2025.01)
*A61J 1/16* (2023.01)

(52) U.S. Cl.
CPC .............. *A01N 1/148* (2025.01); *A61J 1/165* (2013.01)

(58) Field of Classification Search
CPC ............................... A61J 1/165; A01N 1/0273
See application file for complete search history.

(56) References Cited

U.S. PATENT DOCUMENTS 1,901,830 A 3/1933 Gaisman
D333,028 S 2/1993 Lux, Jr.
5,370,226 A 12/1994 Gollobin et al.
D589,157 S 3/2009 Speth
D608,456 S 1/2010 Sandel
D608,457 S 1/2010 Griffiths
D779,678 S 2/2017 Feins et al.
D838,513 S 1/2019 Davis et al.
D873,555 S 1/2020 Wurm
D895,145 S 9/2020 Smith et al.
D911,551 S 2/2021 Aravena
2007/0209960 A1* 9/2007 Leoncavallo ............. A61J 1/16 220/4.27
2009/0090653 A1 4/2009 Forsyth
2013/0340171 A1 12/2013 Oberst
2015/0048082 A1* 2/2015 Galal .................. B65D 21/083 220/4.12
2016/0195218 A1* 7/2016 Cutting ................ A01N 1/0263 62/62

(Continued)

FOREIGN PATENT DOCUMENTS

CN 304525873 8/2017
CN 304894834 S 11/2018

(Continued)

*Primary Examiner* — Schyler S Sanks

(57) ABSTRACT

A bag holder for a blast freezing process includes a bag tray. The bag tray is genderless and can be combined with an identical bag tray to form the bag holder. The bag holder includes a basin, side walls, and an end wall. The first and second side walls each include a set of alternating extended and recessed sections and a channel extending through at least a portion of the set of alternating extended and recessed sections. The alternating extended and recessed sections are offset from one another such that where a set on one side wall has an extended section, the set on the other side wall has a recessed section and vice versa. Methods include forming these bag trays, and placing a bag in one bag tray, then joining another bag tray to form the holder around the bag.

6 Claims, 6 Drawing Sheets

(56) References Cited

U.S. PATENT DOCUMENTS

| | | | |
|---|---|---|---|
| 2022/0295784 | A1 | 9/2022 | Coscia |
| 2022/0298462 | A1 | 9/2022 | Coscia |

FOREIGN PATENT DOCUMENTS

| | | | |
|---|---|---|---|
| JP | S5181234 | U | 6/1976 |
| JP | H07136011 | A | 5/1995 |
| JP | 11157595 | A | 6/1999 |
| JP | 1597363 | S | 2/2018 |
| TW | D172507 | | 12/2015 |
| TW | D198358 | | 7/2019 |
| WO | 2009086136 | | 7/2009 |
| WO | 2019190535 | A1 | 3/2019 |

* cited by examiner 100
102
104
106
108
110
112
114
116
118
120
122
124
126
128
L 200
100a
100
118a
118
126a
104a
128a
124a
116a
112a
102a
106a
108a
114a
116
114
110

BAG HOLDER FOR BLAST FREEZING

CROSS-REFERENCE TO RELATED APPLICATIONS

This application claims priority to U.S. provisional application No. 63/163,547 filed Mar. 19, 2021 with the title "BAG HOLDER FOR BLAST FREEZING."

FIELD

This disclosure is directed to a bag holder for holding a bag during a blast freezing process, particularly a bag holder assembled from a pair of identical genderless bag trays.

BACKGROUND

Chemical and/or biological processes can be carried out, or their results contained in bags. Process materials or materials resulting from the process may need to be frozen or otherwise kept at low temperature. Bags may need to be supported through cooling or freezing processes to ensure the integrity of the bag or maintenance of a desirable shape. Holders may be used to support and shape the bags before, during, and/or after the cooling or freezing process.

SUMMARY

This disclosure is directed to a bag holder for holding a bag during a blast freezing process, particularly a bag holder assembled from a pair of identical genderless bag trays.

The bag holder is configured to support a bag such as a bioprocess bag during a blast freezing process. By providing bag trays, i.e. identical bag trays can be joined to one another without requiring use of different trays, the manufacturing, stocking, and use of the bag holders is simplified. The bag holders provide support for the bag and facilitate blast freezing while maintaining the integrity and shape of the bag.

In an embodiment, a bag holder for supporting a bioprocess bag during freezing includes a bag tray. The bag tray includes a basin, surrounded in part by a first side wall, a second side wall, and an end wall. The end wall includes a recessed portion forming a neck. The first side wall includes a first set of alternating extended and recessed sections and a first channel extending through at least a portion of the first set of alternating extended and recessed sections. The second side wall includes a second set of alternating extended and recessed sections and a second channel extending through at least a portion of the second set of alternating extended and recessed portions. The first set of alternating extended and recessed sections and the second set of alternating extended and recessed sections are offset from one another in the length direction of the first side wall and the second side wall such that where the first set of alternating extended and recessed sections has an extended section, the second set of alternating extended and recessed sections has a recessed section, and where the first set of alternating extended and recessed sections has a recessed section, the second set of alternating extended and recessed sections has an extended section.

In an embodiment, the bag tray is a first bag tray, the bag holder further includes a second bag tray, the second bag tray being identical to the first.

In an embodiment, the first bag tray is configured to be joined to the second bag tray by matching the first set of alternating extended and recessed sections of the first bag tray with the second set of alternating extended and recessed sections of the second bag tray, and the second set of alternating extended and recessed sections of the first bag tray with the first set of alternating extended and recessed sections of the second bag tray.

In an embodiment, when the first bag tray is joined to the second bag tray, the first channel of the first bag tray and the second channel of the second bag tray form a first continuous channel configured to receive a first retention rod and the second channel of the first bag tray and the first channel of the second bag tray form a second continuous channel configured to receive a second retention rod.

In an embodiment, the basin includes a plurality of ribs extending from the first side wall to the second side wall.

In an embodiment, the bag tray includes one or more bulkheads around at least a portion of the basin.

In an embodiment, the bag tray includes a second end wall opposite the end wall including the recessed portion. In an embodiment, the bag holder further includes projection on the second end wall on one side of a center line of the bag holder, and a recess on an opposite side of the center line of the bag holder from the projection, the recess sized such that it is configured to accommodate the projection.

In an embodiment, a method of manufacturing a bag holder for freezing of a bioprocess bag includes forming a first bag tray. The first bag tray includes a basin surrounded in part by a first side wall, a second side wall, and an end wall. The end wall includes a recessed portion forming a neck. The first side wall includes a first set of alternating extended and recessed sections and a first channel extending through at least a portion of the first set of alternating extended and recessed sections. The second side wall includes a second set of alternating extended and recessed sections and a second channel extending through at least a portion of the second set of alternating extended and recessed portions. The first set of alternating extended and recessed sections and the second set of alternating extended and recessed sections are offset from one another in the length direction of the first side wall and the second side wall such that where the first set of alternating extended and recessed sections has an extended section, the second set of alternating extended and recessed sections has a recessed section, and where the first set of alternating extended and recessed sections has a recessed section, the second set of alternating extended and recessed sections has an extended section. The method further includes forming a second bag tray, identical to the first.

In an embodiment, forming the first bag tray includes thermoforming a material. In an embodiment, forming the first bag tray includes injection molding or compression molding. In an embodiment, forming the first bag tray includes cast molding.

In an embodiment, a method of freezing a bioprocess bag includes providing a first bag tray. The first bag tray includes a basin, surrounded in part by a first side wall, a second side wall, and an end wall, the end wall including a recessed portion forming a neck. The first side wall includes a first set of alternating extended and recessed sections and a first channel extending through at least a portion of the first set of alternating extended and recessed sections. The second side wall includes a second set of alternating extended and recessed sections and a second channel extending through at least a portion of the second set of alternating extended and recessed portions. The first set of alternating extended and recessed sections and the second set of alternating extended and recessed sections are offset from one another in the length direction of the first side wall and the second side wall such that where the first set of alternating extended and recessed sections has an extended section, the second set of alternating extended and recessed sections has a recessed section, and where the first set of alternating extended and recessed sections has a recessed section, the second set of alternating extended and recessed sections has an extended section. The method further includes placing the bioprocess bag in the basin of the first bag tray such that a neck of the bioprocess bag is located in a neck of the first bag tray. The method also includes providing a second bag tray, the second bag tray being identical to the first bag tray. The method further includes joining the second bag tray to the first bag tray. The method further includes filling the bioprocess bag and freezing the bioprocess bag.

In an embodiment, freezing the bioprocess bag includes placing the bioprocess bag and the bag support into a blast freezer.

DRAWINGS

DETAILED DESCRIPTION

This disclosure is directed to a bag holder for holding a bag during a blast freezing process particularly a bag holder assembled from a pair of identical genderless bag trays.

Figure 1:
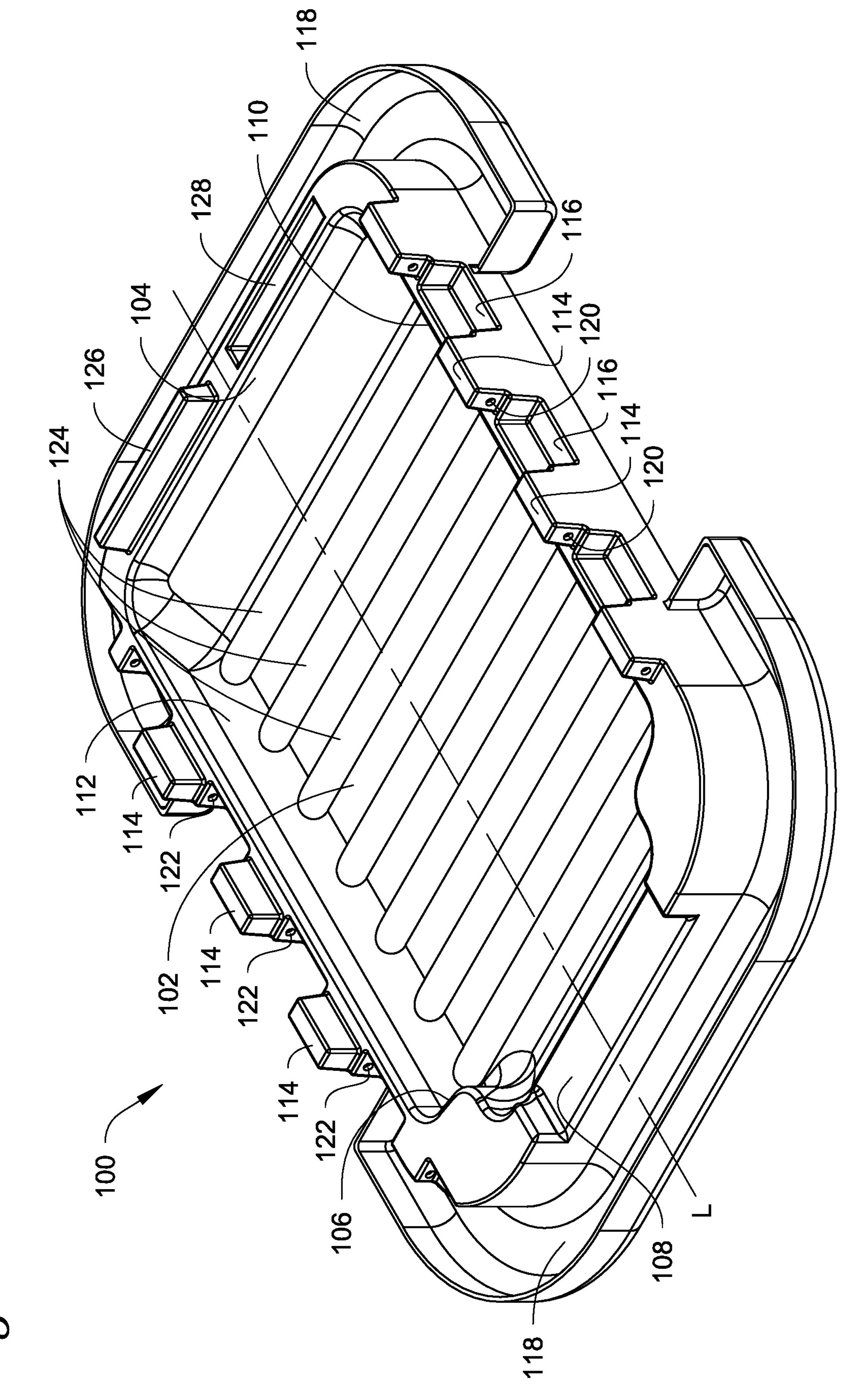
FIG. 1 shows a bag tray of a bag holder according to an embodiment.

FIG. 1 shows a bag tray of a bag holder according to an embodiment. Bag tray 100 includes a basin 102. Basin 102 is surrounded by back wall 104, front wall 106 including neck 108, first side wall 110 and second side wall 112. Bulkheads 118 can be provided outside of at least portions of the back wall 104, front wall 106, neck 108, first side wall 110, and second side wall 112. Each of first side wall 110 and second side wall 112 include alternating extended portions 114 and recessed portions 116. First channel 120 extends through the extended portions 114 on first side wall 110. Second channel 122 extends through the extended portions 114 on second side wall 112, and optionally through other portions of second side wall 112. Basin 102 can optionally include ribs 124.

Bag tray 100 can be formed of one or more materials suitable for use in blast freezing processes. In an embodiment, the materials used in bag tray 100 are rated for use at temperatures of approximately −85° C. or less. In an embodiment, bag tray 100 is formed from one or more melt-processable polymers. In an embodiment, bag tray 100 includes polyethylene (PE). In an embodiment, bag tray 100 includes high density polyethylene (HDPE). In an embodiment, bag tray 100 is a single piece. In an embodiment, at least a portion of bag tray 100 is produced by a method including thermoforming. In an embodiment, at least a portion of bag tray 100 is produced by injection molding. In an embodiment, at least a portion of bag tray 100 is formed by cast molding. In an embodiment, the cast molding can be two-part cast molding. In an embodiment, at least a portion of bag tray 100 is formed by compression molding.

Basin 102 is shaped and positioned such that it can contain the bag to be held for freezing, such as in a blast freezing process. Optionally, basin 102 can include ribs 124 to secure and shape the bag during freezing. Ribs 124 can project inwards into the basin 102. In an embodiment, ribs 124 extend in a direction from first side wall 110 towards second side wall 112. In an embodiment, ribs 124 improve structural strength of the basin 102.

Figure 2:
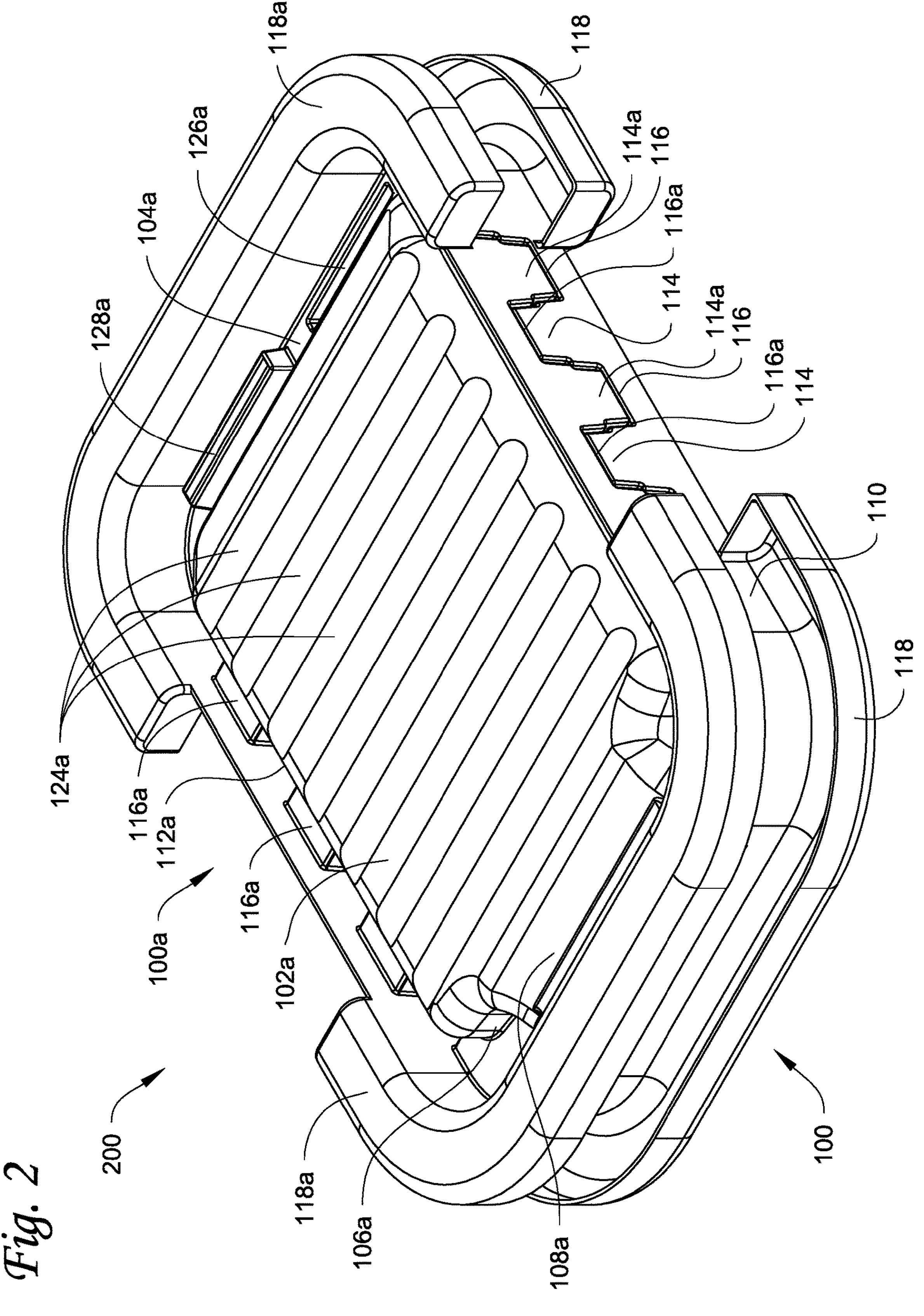
FIG. 2 shows an assembled bag holder according to an embodiment.

Back wall 104 is a wall partially defining basin 102. In an embodiment, basin 102 includes a portion sloping upwards to meet back wall 104. Back wall 104 can optionally include a back wall projection 126 on a first side of a longitudinal axis L of the bag tray 100 and a back wall recess 128 on a second side of the longitudinal axis L. The back wall recess 128 and the back wall projection 126 can be positioned, shaped, and sized such that when the bag trays 100 is assembled into a bag holder, the projections 126 of each bag tray 100 can be received in the recesses 128 of the other of the bag trays, as shown in FIG. 2 and described below. This can retain bag trays to one another along the back wall 104 in addition to the first and second side walls 110 and 112.

Front wall 106 is another wall partially defining basin 102. In an embodiment, basin 102 includes a portion sloping upwards towards front wall 106. Front wall 106 can include neck 108. Neck 108 can be a relatively recessed portion of front wall 106 configured to allow a bag neck and/or tubes connected to a bag to extend out of the basin 102 when bag tray 100 is assembled into a bag holder. In an embodiment, neck 108 is positioned centered with respect to the longitudinal axis L of the bag tray 100. In an embodiment, front wall 106 outside of the neck 108 can have a height that is the same as the height of back wall 104.

First side wall 110 is a wall partially defining basin 102, extending from back wall 104 to front wall 106 on a first side of basin 102. Second side wall 112 is another wall partially defining basin 102, extending from back wall 104 to front wall 106 on a second side of basin 102, opposite the first side with respect to longitudinal axis L of the bag tray 100. In an embodiment, first side wall 110 and second side wall 112 each include at least a portion having a height that is the same as the height of back wall 104 and/or front wall 106.

Each of first side wall 110 and second side wall 112 include a set of extended portions 114 and recessed portions 116. The extended portions 114 are parts of first side wall 110 and second side wall 112 that extend above the height of back wall 104 and front wall 106. The recessed portions 116 are parts of first side wall 110 and second side wall 112 that are recessed below the height of back wall 104 and front wall 106. In an embodiment, the extended portions 114 and/or the recessed portions 116 can be on an outer portion of first side wall 110 or second side wall 112, with an inner portion of first side wall 110 or second side wall 112 having a height that is the same as back wall 104 and front wall 106 on an inner portion towards the basin 102. The extended portions 114 and recessed portions 116 can be alternating with each set. The extended portions 114 and recessed portions 116 of each set can be sized and positioned such that the extended portions 114 of first side wall 110 correspond to recessed portions 116 of the second side wall 112, and the extended portions 114 of the second side wall 112 correspond to the recessed portions 116 of the first side wall 110. In an embodiment, the recessed portions 116 of bag tray 100 can be configured to receive extended portions of a second bag tray identical to bag tray 100, as shown in FIG. 2 and described below.

Bulkheads 118 are projections extending outwards, away from basin 102, from at least portions of back wall 104, front wall 106, first side wall 110, and/or second side wall 112. Bulkheads 118 are configured to absorb shocks from contact of the bag tray 100 with other surfaces, for example if a bag holder including bag tray 100 is dropped or bumped. Bulkheads 118 can have any suitable shape for providing shock protection to basin 102 and its contents, such as the generally U-shaped cross-sections. Bulkheads 118 can further be configured to provide a space to accommodate tubes extending from a bag located within basin 102 when bag tray 100 is assembled into a bag holder.

First channel 120 is a channel formed by one or more openings in extended portions 114 of one of first side wall 110 or second side wall 112. The first channel 120 can be positioned a distance D above the height of the back wall 104 or the front wall 106. The first channel 120 can have a cross-sectional shape to accept a retention rod (not shown).

Figure 4:
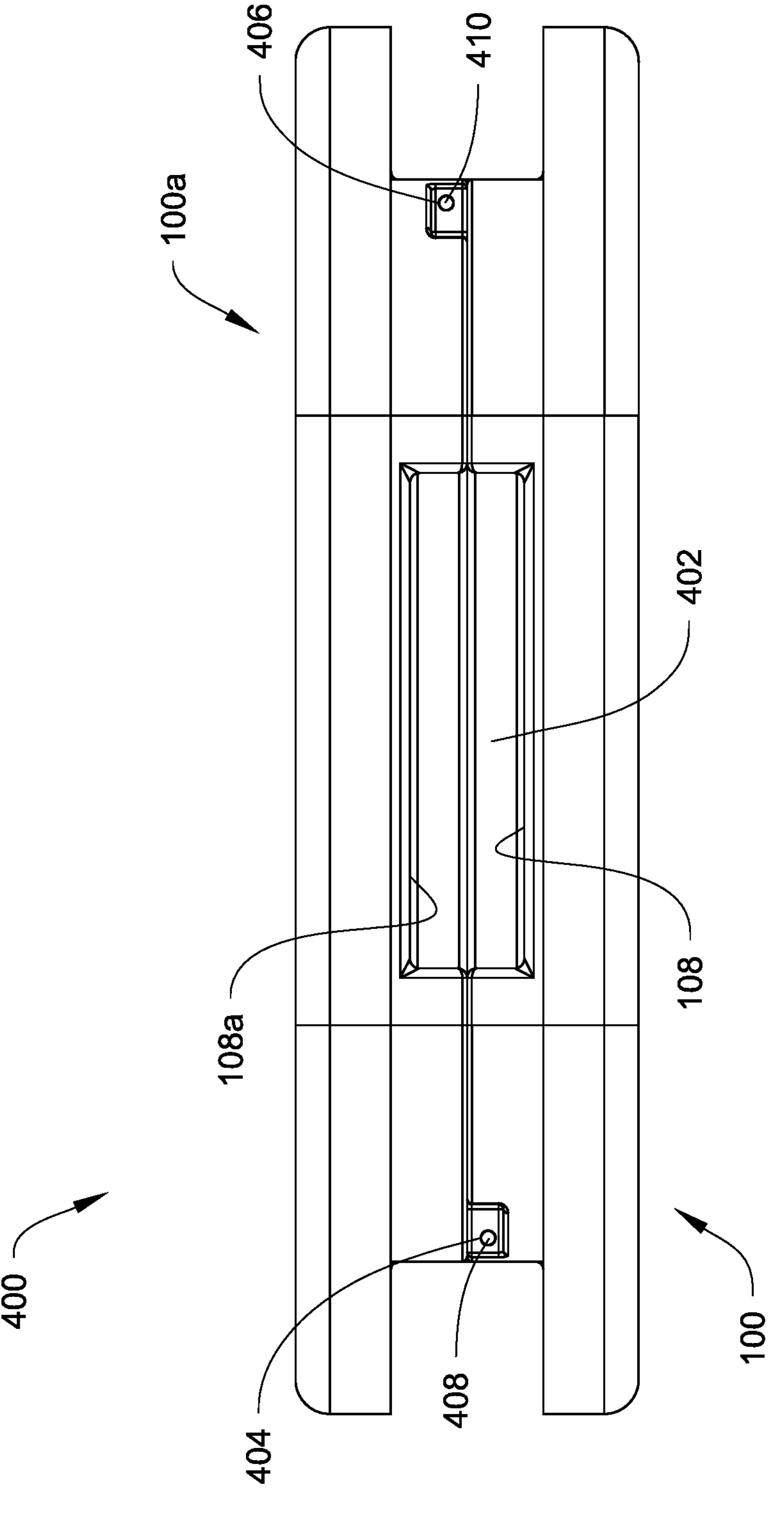
FIG. 4 shows the bag tray and bag of FIG. 3 assembled into a bag holder according to an embodiment.

Second channel 122 is another channel formed by an opening through one of first side wall 110 or second side wall 112 and extended portions 114 thereof. In an embodiment, the second channel 122 has a cross-sectional shape that is the same as the first channel 120. The second channel 122 can be positioned at the distance D below the height of back wall 104 or the front wall 106, such that when bag tray 100 and an identical bag tray are joined, as shown in FIG. 2, the first channel 120 of the bag tray 100 and the second channel of the identical bag tray form a continuous channel, and vice versa. The continuous channels formed by the combinations of first channel 120 and second channel 122 of identical bag tray holders 100 can accommodate retention rods, as shown in FIG. 4 and described below. In embodiments, identical bag trays 100 can be retained by one or more of screws or pins passing vertically through the bag trays, one or more ties surrounding the bag trays, or any suitable other means of holding the trays together. These other methods of securing tray to one another can be in addition to or in place of first and second channels 120 and 122 and retention rods accommodated within said channels.

FIG. 2 shows an assembled bag holder according to an embodiment. Bag holder 200 includes bag tray 100 shown in FIG. 1 and described above, combined with a second bag holder 100*a*. In an embodiment, the second bag tray 100*a* is identical to the first bag holder 100.

Second bag tray 100*a* includes a basin 102*a*. Basin 102*a* is defined at least in part by a back wall 104*a*, a front wall 106*a*, a first side wall 110*a*, and a second side wall 112*a*. Front wall 106*a* can include a neck 108*a*. One or more bulkheads 118*a* can be provided on some or all of back wall 104*a*, front wall 106*a*, first side wall 110*a*, and second side wall 112*a*.

When bag tray 100 and second bag tray 100*a* are joined, the basin 102*a* and the basin 102 can combine to form an internal space of the bag holder 200. In an embodiment, the respective back walls 104 and 104*a*, front walls 106 and 106*a* and portions of the first and second side walls 110, 110*a*, 112, and 112*a* of the respective first and second bag trays 100, 100*a* can contact one another to define the internal space. The basins 102 and 102*a* of first and second bag trays 100 and 100*a* can be sized in accordance with the fill volume of a bag to be used with the bag holder 200, such that the filling of the bag is not constrained by the available volume of the internal space or the shape of the internal space compared to the geometry of said bag. The internal space of bag holder 200 is configured such that it can contain a bag, such as a bag containing a biological or chemical solution. The bag holder 200 can contain the bag during a process such as a blast freezing process. In an embodiment, the second bag tray 100*a* includes ribs 124*a* projecting inwards towards basin 102*a*.

Second bag tray 100*a* includes extending portions 116*a* and recessed portions 118*a*. When second bag tray 100*a* is joined to first bag tray 100, the extending portions 116*a* of second bag tray 100*a* project into corresponding recessed portions 118 of first bag tray 100. When second bag tray 100*a* is joined to first bag tray 100, the recessed portions 118*a* of second bag tray 100*a* receive the corresponding protruding portions 116 of first bag tray 100.

In an embodiment, the second bag tray 100*a* further includes back wall projection 126*a* and back wall recess 128*a*. When the second bag tray 100*a* is joined to first bag tray 100, the back wall projection 126 of the first bag tray 100 shown in FIG. 1 can be received in back wall recess 128*a* of the second bag tray 100*a*. When the second bag tray 100*a* is joined to first bag tray 100, the back wall recess 128 of the first bag tray 100 shown in FIG. 1 can receive the back wall projection 126*a* of the second bag tray 100*a*.

Further, when the first bag tray 100 is joined to a second bag tray 100*a*, one or more channels can be formed to receive retention rods to secure the first and second bag trays 100, 100*a* to one another. The channels and retention rods can be seen in FIG. 4 and are described in further detail below.

Figure 3:
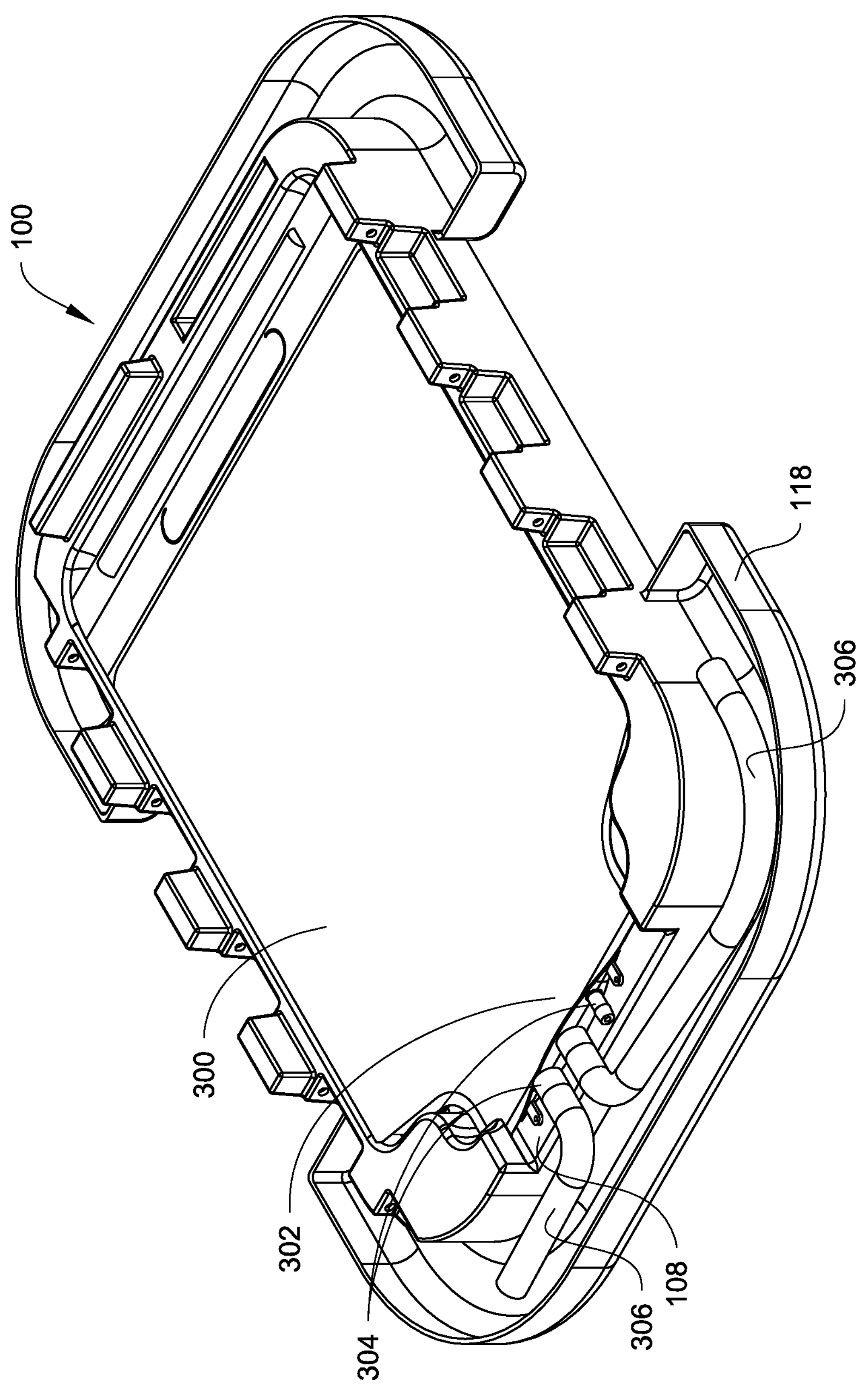
FIG. 3 shows a bag tray according to FIG. 1 with a bag located in the basin.

FIG. 3 shows a bag tray according to FIG. 1 with a bag located in the basin. Bag tray 100 is shown with a bag 300 placed into basin 102. Bag 300 includes a bag neck 302 that extends into neck 108 of the bag tray 100. Bag neck 302 includes ports 304, connecting to fluid lines 306, located within neck 108 of bag tray 100 when the bag 300 is placed into basin 102. Fluid lines 306 extend out of the neck 108. At least some of fluid lines 306 can be bent such that the fluid lines 306 rest within portions of bulkhead 118.

FIG. 4 shows the bag tray and bag of FIG. 3 assembled into a bag holder according to an embodiment. A second bag tray 100*a* is added to the bag tray 100 shown in FIG. 3 to form the bag holder 400. Neck 108*a* of second bag tray 100*a* and neck 108 of bag tray 100 combine to form an opening 402 between an interior and an exterior of the space defined by the combined bag trays 100 and 100*a*. When combined, the first and second bag trays 100, 100*a* provide first channel 404 and second channel 406. Each of first channel 404 and second channel 406 include portions extending through each of first bag tray 100 and second bag tray 100*a*. The first channel 404 can receive a first retention rod 408. The second channel 406 can receive a second retention rod 410. In an embodiment, the first retention rod 408 and the second retention rod 410 have the same cross-sectional shape. First and second retention rods 408 and 410 can be any suitable material for retaining bag holder 400 together during a blast freezing process, such as, as a non-limiting example, a steel material such as stainless steel. By extending through portions of both first bag tray 100 and second bag tray 100*a* by way of first and second channels 404 and 406, the first and second retention rods 408 and 410 can secure the first bag tray 100 and the second bag tray 100*a* to one another, for example to ensure that the bag holder 400 is secured. Use of first and second retention rods 408 and 410 can allow the bag holder 400 to be readily assembled and disassembled to allow removal of a bag following the freezing process. In an embodiment, when bag holder 400 is secured, the opening 402 provided by neck 108 and neck 108*a* is the only opening between the internal space and an exterior environment of the bag holder 400. Retention rods 408 and 410 can be held within their respective channels 404 and 406 by a friction fit.

Bag holders according to embodiments can be used in a blast freezing process by placing a bag such as bag 300 within a basin of a first bag tray. The bag can be filled by way of at least one or more fluid lines such as fluid lines 306. The bag 300 can be filled prior to placement within basin 102, following placement within basin 102, or following assembly of the bag holder by addition of a second bag tray. Following placement of the bag within the basin of the first bag tray, the bag holder can be assembled by joining a second bag tray such as second bag tray 100*a* to the first bag tray. In an embodiment, the first and second bag tray can engage with one another, for example at respective extending and recessed portions, corresponding engagement features, or the like. In an embodiment, the first bag tray and the second bag tray can be joined by one or more additional members, such as retention rods 406 and 408 described above and shown in FIG. 4. One the bag is contained within an assembled bag holder and is filled, the bag and bag holder can be used in a freezing process, for example a blast-freezing process.

Figure 5:
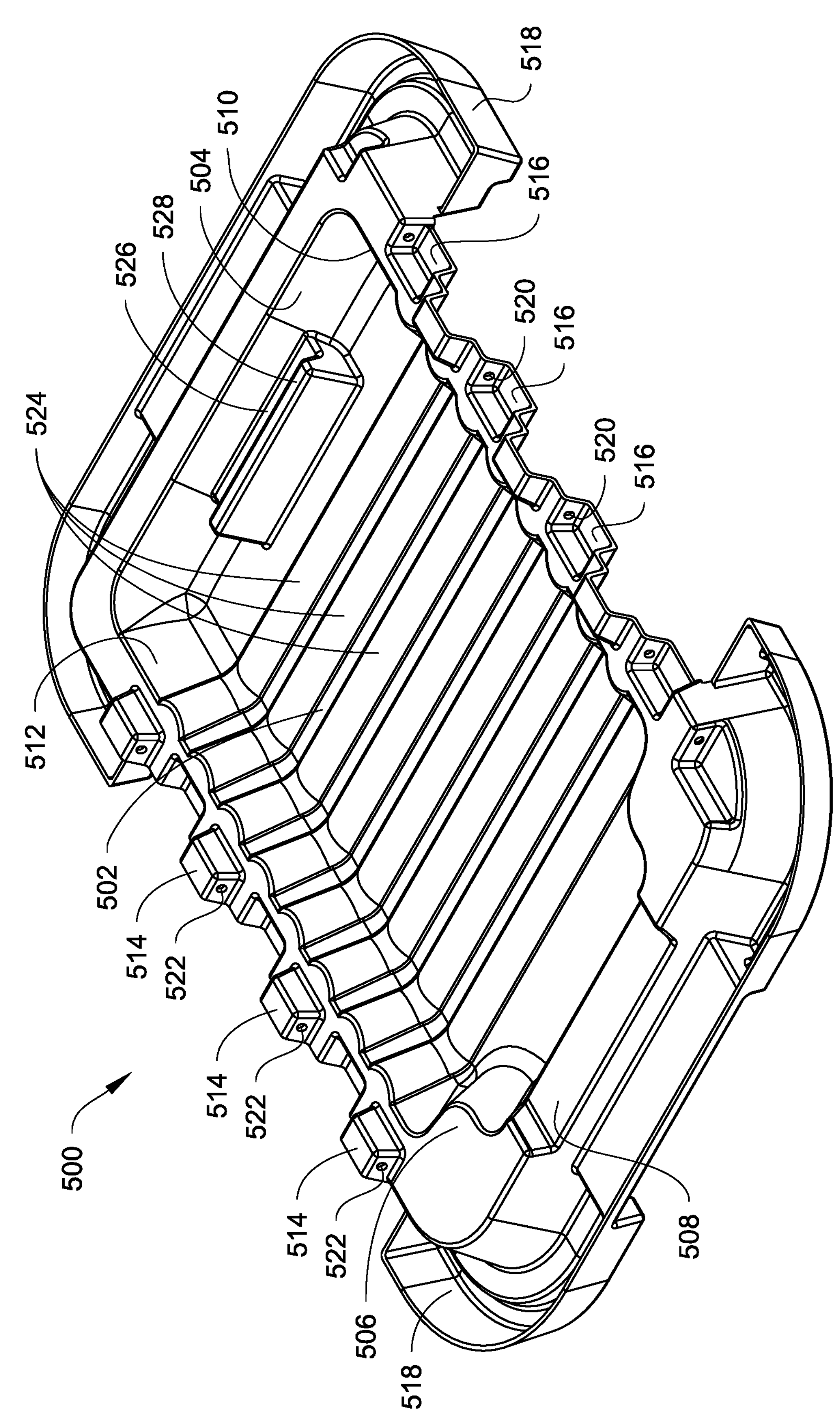
FIG. 5 shows a bag tray according to an embodiment.

FIG. 5 shows a bag tray according to an embodiment. Bag tray 500 includes a basin 502. Basin 502 is surrounded by back wall 504, front wall 506 including neck 508, first side wall 510 and second side wall 512. Each of first side wall 510 and second side wall 512 include alternating extended portions 514 and recessed portions 516. Bulkheads 518 can be provided outside of at least portions of the back wall 504, front wall 506, neck 508, first side wall 510, and second side wall 512. First channel 520 extends through the recessed portions 516 on first side wall 510. Second channel 522 extends through the extended portions 514 on second side wall 512. Basin 502 can optionally include ribs 524.

Basin 502 is shaped and positioned such that it can contain the bag to be held for freezing, such as in a blast freezing process. Optionally, basin 502 can include ribs 524 to secure and shape the bag during freezing. Ribs 524 can project inwards into the basin 502. In an embodiment, ribs 524 extend in a direction from first side wall 510 towards second side wall 512. In an embodiment, the ribs are formed in first side wall 510 and second side wall 512 in addition to being formed in basin 502. In an embodiment, ribs 524 improve structural strength of the basin 502.

Figure 6:
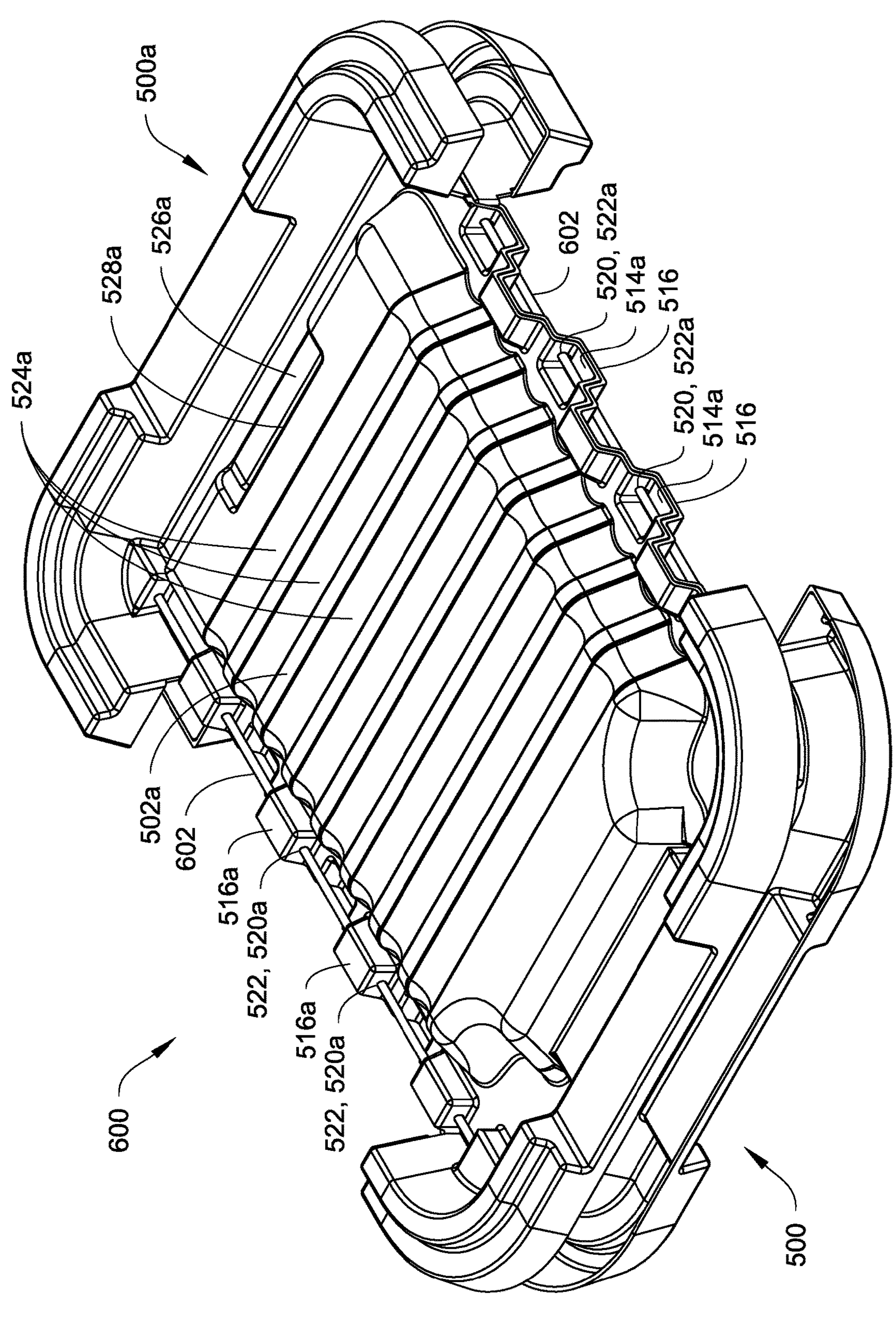
FIG. 6 shows a bag holder according to an embodiment including the bag tray shown in FIG. 5.

Back wall 504 is a wall partially defining basin 502. In an embodiment, basin 502 includes a portion sloping upwards to meet back wall 504. Back wall 504 can a shelf 526 configured to support a hanging rod of a bag placed within basin 502 and a hook 528 configured to prevent movement of the hanging rod in a horizontal direction, to assist in fixing the position of the bag when bag tray 500 is assembled into a bag holder, for example as shown in FIG. 6 and described below. In an embodiment, projections and recesses such as the projection 126 and recess 128 provided on bag tray 100 can further be included in back wall 504.

Front wall 506 is another wall partially defining basin 502. In an embodiment, basin 502 includes a portion sloping upwards towards front wall 506. Front wall 506 can include neck 508. Neck 508 can be a relatively recessed portion of front wall 506 configured to allow a bag neck and/or tubes connected to a bag to extend out of the basin 502 when bag tray \00 is assembled into a bag holder. In an embodiment, neck 108 is positioned centered with respect to the longitudinal axis L of the bag tray 100. In an embodiment, front wall 106 outside of the neck 108 can have a height that is the same as the height of back wall 104.

First side wall 510 is a wall partially defining basin 502, extending from back wall 504 to front wall 506 on a first side of basin 502. Second side wall 512 is another wall partially defining basin 502, extending from back wall 504 to front wall 506 on a second side of basin 502, opposite the first side.

Each of first side wall 510 and second side wall 512 include alternating extended portions 514 and recessed portions 516. The extended portions 514 are parts of first side wall 510 and second side wall 512 that extend above the height of back wall 504 and front wall 506. The recessed portions 516 are parts of first side wall 510 and second side wall 512 that are recessed below the height of back wall 504 and front wall 506. The extended portions 514 and recessed portions 516 can be alternating with each set. The extended portions 514 and recessed portions 516 of each set can be sized and positioned such that the extended portions 514 of first side wall 510 correspond to recessed portions 516 of the second side wall 512, and the extended portions 514 of the second side wall 512 correspond to the recessed portions 516 of the first side wall 510. In an embodiment, the recessed portions 516 of bag tray 500 can be configured to receive extended portions of a second bag tray identical to bag tray 500, as shown in FIG. 6 and described below.

Bulkheads 518 are projections extending outwards, away from basin 502, from at least portions of back wall 504, front wall 506, first side wall 510, and/or second side wall 512. Bulkheads 518 are configured to absorb shocks from contact of the bag tray 500 with other surfaces, for example if a bag holder including bag tray 500 is dropped or bumped. Bulkheads 518 can have any suitable shape for providing shock protection to basin 502 and its contents. Bulkheads 518 can further be configured to provide a space to accommodate tubes extending from a bag located within basin 502 when bag tray 500 is assembled into a bag holder with a bag located inside.

First channel 520 extends through the recessed portions 516 on first side wall 510. Second channel 522 extends through the extended portions 514 on second side wall 512. First channel 520 is a channel formed by one or more openings in recessed portions 516 of first side wall 510. The first channel 120 can have a cross-sectional shape to accept a retention rod (not shown). Second channel 122 is another channel formed by one or more openings through extended portions 514 of the second side wall 512. In an embodiment, the second channel 522 has a cross-sectional shape that is the same as the first channel 520. The first and second channels 520 and 522 can be positioned such that when bag tray 100 and an identical bag tray are joined, as shown in FIG. 6, the first channel 520 of the bag tray 500 and the second channel of the identical bag tray form a continuous channel, and vice versa. The continuous channels formed by the combinations of first channel 520 and second channel 522 of identical bag tray holders 500 can accommodate retention rods, as shown in FIG. 6 and described below. In embodiments, identical bag trays 500 can be retained by one or more of screws or pins passing vertically through the bag trays, one or more ties surrounding the bag trays, or any suitable other means of holding the trays together. These other methods of securing tray to one another can be in addition to or in place of first and second channels 520 and 522 and retention rods accommodated within said channels.

FIG. 6 shows a bag holder according to an embodiment including the bag tray shown in FIG. 5. Second bag tray 500*a* is combined with bag tray 500, referred to as first bag tray 500, to form the bag holder 600.

When bag tray 500 and second bag tray 500*a* are joined, the basin 502*a* and the basin 502 can combine to form an internal space of the bag holder 600. The basins 502 and 502*a* of first and second bag trays 500 and 500*a* can be sized in accordance with the fill volume of a bag to be used with the bag holder 600, such that the filling of the bag is not constrained by the available volume of the internal space or the shape of the internal space compared to the geometry of said bag. The internal space of bag holder 600 is configured such that it can contain a bag, such as a bag containing a biological or chemical solution. The bag holder 600 can contain the bag during a process such as a blast freezing process. In an embodiment, the second bag tray 500*a* includes ribs 524*a* projecting inwards towards basin 502*a*.

Second bag tray 500*a* includes extending portions 516*a* and recessed portions 518*a*. When second bag tray 500*a* is joined to first bag tray 500, the extending portions 516*a* of second bag tray 500*a* project into corresponding recessed portions 518 of first bag tray 500. When second bag tray 500*a* is joined to first bag tray 500, the recessed portions 518*a* of second bag tray 500*a* receive the corresponding protruding portions 516 of first bag tray 500. The first channel 520 of the bag tray 500 and the second channel 522*a* of the second bag tray 500*a* form a continuous channel configured to allow insertion of retention rod 602. The second channel 522 of the second bag tray can also form a continuous channel with a first channel 520*a* of the second bag tray 500*a*, such that another retention rod 602 can be accommodated in the resulting channel. The retention rods 602 can fix the first bag tray 500 to the second bag tray 500*a*, for example to hold the bag holder 600 together during handling and/or freezing processes such as a blast freezing process. The retention rods can be any suitable material having strength and temperature resistance to hold bag holder 600 together prior to, during, and following freezing processes, for example stainless steel.

When bag holder 600 is assembled, shelf 526*a* of the first bag tray 500, described above and shown in FIG. 5, and corresponding shelf 526*a* of the second bag tray 500*a* can be opposite one another, defining a space that can accommodate a hanging rod of a bag placed within the bag holder 600. The hook 528 of the first bag tray 500, described above and shown in FIG. 5, and the corresponding hook 528*a* of the second bag tray 500 can combine to obstruct movement of the hanging rod outside of the space defined by shelves 526 and 526*a*, such that the hanging rod can be used to restrict movement of a bag contained in the bag holder 600 in a direction from back walls 504 and 504*a* towards or away from front walls 506 and 506*a*. In an embodiment, the bag can be clamped between hooks 528 and 528*a* when the bag holder 600 is assembled.

Aspects:

It is understood that any of aspects 1-8 can be combined with any of aspects 9-12 or aspects 13-14. It is understood that any of aspects 9-12 can be combined with any of aspects 13-14.

Aspect 1. A bag holder for supporting a bioprocess bag during freezing, comprising:

a bag tray including:

a basin, surrounded in part by a first side wall, a second side wall, and an end wall, the end wall including a recessed portion forming a neck;

wherein the first side wall includes a first set of alternating extended and recessed sections and a first channel extending through at least a portion of the first set of alternating extended and recessed sections;

the second side wall includes a second set of alternating extended and recessed sections and a second channel extending through at least a portion of the second set of alternating extended and recessed portions; and the first set of alternating extended and recessed sections and the second set of alternating extended and recessed sections are offset from one another in the length direction of the first side wall and the second side wall such that where the first set of alternating extended and recessed sections has an extended section, the second set of alternating extended and recessed sections has a recessed section, and where the first set of alternating extended and recessed sections has a recessed section, the second set of alternating extended and recessed sections has an extended section.

Aspect 2. The bag holder according to aspect 1, wherein the bag tray is a first bag tray, the bag holder further comprising a second bag tray, the second bag tray identical to the first.

Aspect 3. The bag holder according to aspect 2, wherein the first bag tray is configured to be joined to the second bag tray by mating the first set of alternating extended and recessed sections of the first bag tray with the second set of alternating extended and recessed sections of the second bag tray, and the second set of alternating extended and recessed sections of the first bag tray with the first set of alternating extended and recessed sections of the second bag tray.

Aspect 4. The bag holder according to aspect 3, wherein when the first bag tray is joined to the second bag tray, the first channel of the first bag tray and the second channel of the second bag tray form a first continuous channel configured to receive a first retention rod and the second channel of the first bag tray and the first channel of the second bag tray form a second continuous channel configured to receive a second retention rod.

Aspect 5. The bag holder according to any of aspects 1-4, wherein the basin includes a plurality of ribs extending from the first side wall to the second side wall.

Aspect 6. The bag holder according to any of aspects 1-6, wherein the bag tray further comprises one or more bulkheads around at least a portion of the basin.

Aspect 7. The bag holder according to any of aspects 1-6, wherein the bag tray further comprises a second end wall opposite the end wall including the recessed portion.

Aspect 8. The bag holder according to aspect 7, further comprising a projection on the second end wall on one side of a center line of the bag holder, and a recess on an opposite side of the center line of the bag holder from the projection, the recess sized such that it is configured to accommodate the projection.

Aspect 9. A method of manufacturing a bag holder for freezing of a bioprocess bag, comprising:

forming a first bag tray, the first bag tray including:

a bag tray including:

a basin, surrounded in part by a first side wall, a second side wall, and an end wall, the end wall including a recessed portion forming a neck, wherein the first side wall includes a first set of alternating extended and recessed sections and a first channel extending through at least a portion of the first set of alternating extended and recessed sections;

the second side wall includes a second set of alternating extended and recessed sections and a second channel extending through at least a portion of the second set of alternating extended and recessed portions; and the first set of alternating extended and recessed sections and the second set of alternating extended and recessed sections are offset from one another in the length direction of the first side wall and the second side wall such that where the first set of alternating extended and recessed sections has an extended section, the second set of alternating extended and recessed sections has a recessed section, and where the first set of alternating extended and recessed sections has a recessed section, the second set of alternating extended and recessed sections has an extended section; and forming a second bag tray, identical to the first.

Aspect 10. The method according to aspect 9, wherein forming the first bag tray includes thermoforming a material.

Aspect 11. The method according to any of aspects 9-10 wherein forming the first bag tray includes injection molding or compression molding.

Aspect 12. The method according to any of aspects 9-11, wherein forming the first bag tray includes cast molding.

Aspect 13. A method of freezing a bioprocess bag, comprising:

providing a first bag tray, the first bag tray including:

a basin, surrounded in part by a first side wall, a second side wall, and an end wall, the end wall including a recessed portion forming a neck;

wherein the first side wall includes a first set of alternating extended and recessed sections and a first channel extending through at least a portion of the first set of alternating extended and recessed sections;

the second side wall includes a second set of alternating extended and recessed sections and a second channel extending through at least a portion of the second set of alternating extended and recessed portions; and the first set of alternating extended and recessed sections and the second set of alternating extended and recessed sections are offset from one another in the length direction of the first side wall and the second side wall such that where the first set of alternating extended and recessed sections has an extended section, the second set of alternating extended and recessed sections has a recessed section, and where the first set of alternating extended and recessed sections has a recessed section, the second set of alternating extended and recessed sections has an extended section;

placing the bioprocess bag in the basin of the first bag tray such that a neck of the bioprocess bag is located in a neck of the first bag tray;

providing a second bag tray, the second bag tray being identical to the first bag tray;

joining the second bag tray to the first bag tray;

filling the bioprocess bag; and freezing the bioprocess bag.

Aspect 14. The method according to aspect 13, wherein freezing the bioprocess bag includes placing the bioprocess bag and the bag support into a blast freezer.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A bag holder for supporting a bioprocess bag during freezing, comprising:

a bag tray including:

a basin, surrounded in part by a first side wall, a second side wall, a back wall, and an end wall, the end wall including a recessed portion forming a neck;

wherein the back wall includes a single back wall projection on a first side of a longitudinal axis of the bag tray and a single back wall recess on a second side of the longitudinal axis of the bag tray, wherein the second side of the longitudinal axis is opposite the first side of the longitudinal axis;

wherein the first side wall includes a first set of alternating extended and recessed sections and a first channel extending through at least a portion of the first set of alternating extended and recessed sections;

the second side wall includes a second set of alternating extended and recessed sections and a second channel extending through at least a portion of the second set of alternating extended and recessed portions; and the first set of alternating extended and recessed sections and the second set of alternating extended and recessed sections are offset from one another in the length direction of the first side wall and the second side wall such that where the first set of alternating extended and recessed sections has an extended section, the second set of alternating extended and recessed sections has a recessed section, and where the first set of alternating extended and recessed sections has a recessed section, the second set of alternating extended and recessed sections has an extended section.

2. The bag holder of claim 1, wherein the bag tray is a first bag tray, the bag holder further comprising a second bag tray, the second bag tray having substantially the same features to the first.

3. The bag holder of claim 2, wherein the first bag tray is configured to be joined to the second bag tray by mating the first set of alternating extended and recessed sections of the first bag tray with the second set of alternating extended and recessed sections of the second bag tray, and the second set of alternating extended and recessed sections of the first bag tray with the first set of alternating extended and recessed sections of the second bag tray.

4. The bag holder of claim 3, wherein when the first bag tray is joined to the second bag tray, the first channel of the first bag tray and the second channel of the second bag tray form a first continuous channel configured to receive a first retention rod and the second channel of the first bag tray and the first channel of the second bag tray form a second continuous channel configured to receive a second retention rod.

5. The bag holder of claim 1, wherein the basin includes a plurality of ribs extending from the first side wall to the second side wall.

6. The bag holder of claim 1, wherein the bag tray further comprises one or more bulkheads around at least a portion of the basin.

* * * * *